US012602676B2

(12) United States Patent
Wu

(10) Patent No.: US 12,602,676 B2
(45) Date of Patent: Apr. 14, 2026

(54) IMAGE-BASED USER POSE DETECTION FOR USER ACTION PREDICTION

(71) Applicant: Maplebear Inc., San Francisco, CA (US)

(72) Inventor: Ganglu Wu, Shanghai (CN)

(73) Assignee: Maplebear Inc., San Francisco, CA (US)

( * ) Notice: Subject to any disclaimer, the term of this patent is extended or adjusted under 35 U.S.C. 154(b) by 238 days.

(21) Appl. No.: 18/499,154

(22) Filed: Oct. 31, 2023

(65) Prior Publication Data

US 2025/0139687 A1 May 1, 2025

Related U.S. Application Data

(63) Continuation of application No. PCT/CN2023/123806, filed on Oct. 10, 2023.

(51) Int. Cl.
*G06Q 20/18* (2012.01)
*G06Q 30/0601* (2023.01)
*G06T 7/70* (2017.01)
*G06V 20/52* (2022.01)
*G06V 40/20* (2022.01)

(52) U.S. Cl.
CPC ......... *G06Q 20/18* (2013.01); *G06Q 30/0633* (2013.01); *G06T 7/70* (2017.01); *G06V 20/52* (2022.01); *G06V 40/20* (2022.01)

(58) Field of Classification Search
None
See application file for complete search history.

(56) References Cited

U.S. PATENT DOCUMENTS

| | | | |
|---|---|---|---|
| 10,510,219 B1 * | 12/2019 | Zalewski | ............. H02N 11/002 |
| 2018/0218351 A1 | 8/2018 | Chaubard et al. | |
| 2020/0184230 A1 | 6/2020 | Liu et al. | |
| 2021/0042816 A1 | 2/2021 | Chomley et al. | |
| 2021/0342807 A1 * | 11/2021 | Meidar | ................ G06Q 20/203 |
| 2022/0198550 A1 | 6/2022 | Meidar et al. | |

FOREIGN PATENT DOCUMENTS

| | | |
|---|---|---|
| CN | 109409291 A | 3/2019 |
| CN | 109829777 A | 5/2019 |
| KR | 10-2525234 B1 | 4/2023 |
| WO | WO 2023/039677 A1 | 3/2023 |

OTHER PUBLICATIONS

PCT International Search and Written Opinion, PCT Application No. PCT/CN2023/123806, Jun. 13, 2024, 9 pages.

* cited by examiner

*Primary Examiner* — Thomas S Mccormack
(74) *Attorney, Agent, or Firm* — Fenwick & West LLP

(57) ABSTRACT
A system may access a first set of images captured by cameras coupled to a shopping cart, wherein each image depicts a user associated with the shopping cart. A system may apply a pose detection model to each of the images to predict a user's pose. A system may apply an action prediction model to the set of images and the predicted poses to predict whether the user performed an action to change the contents of a storage area of the shopping cart. A system may, responsive to predicting that the user performed a change action, apply an item identification model to a second set of images of a storage area of the shopping cart to identify an item associated with the change action. A system may update an item list of the user based on the change action and the identified item.

18 Claims, 5 Drawing Sheets

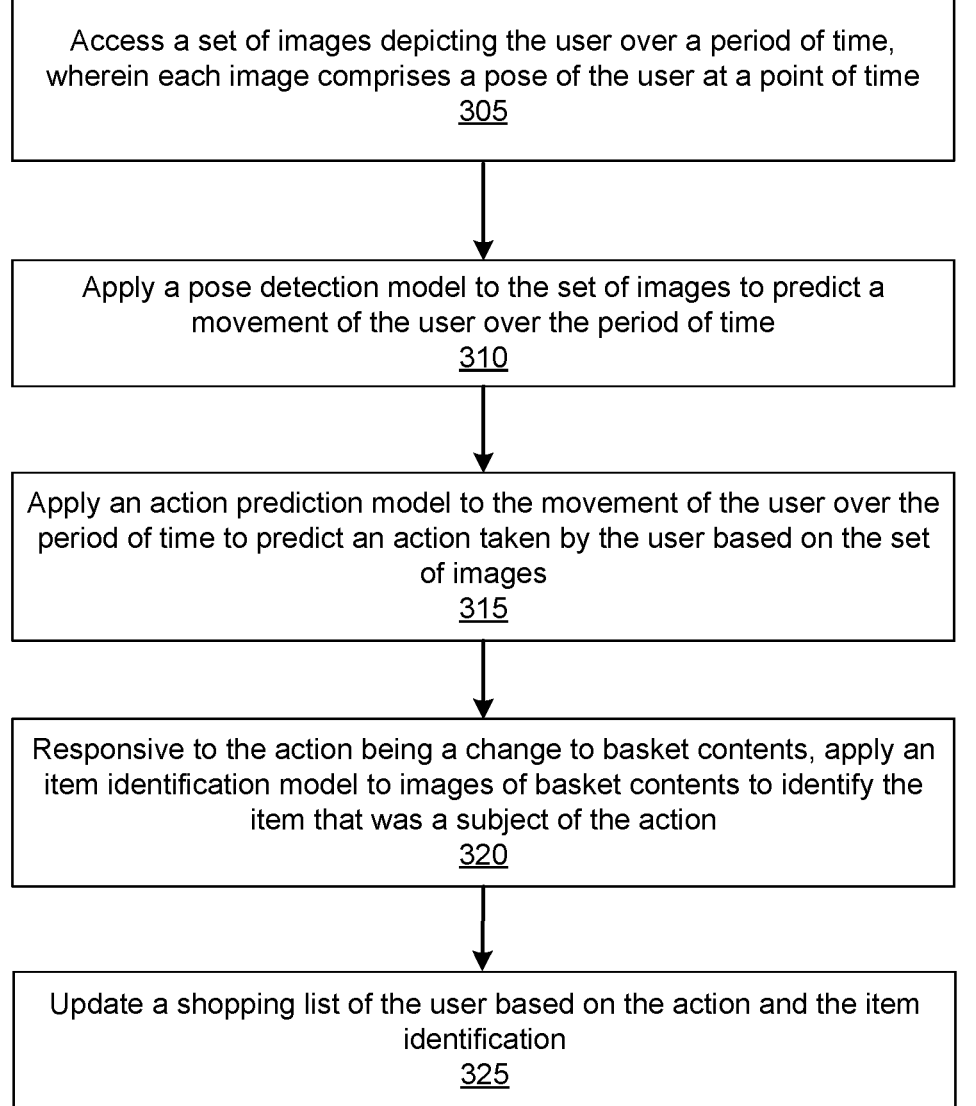

Access a set of images depicting the user over a period of time, wherein each image comprises a pose of the user at a point of time
305

Apply a pose detection model to the set of images to predict a movement of the user over the period of time
310

Apply an action prediction model to the movement of the user over the period of time to predict an action taken by the user based on the set of images
315

Responsive to the action being a change to basket contents, apply an item identification model to images of basket contents to identify the item that was a subject of the action
320

Update a shopping list of the user based on the action and the item identification
325

FIG. 3

Camera
Field of
View
420

User Interface
110

105a

105b

Storage
Area
400

Wine

170a

170b

User
410

IMAGE-BASED USER POSE DETECTION FOR USER ACTION PREDICTION

CROSS REFERENCE TO RELATED APPLICATIONS

This application is a bypass continuation of PCT Application No. PCT/CN2023/0123806, filed Oct. 10, 2023, which is incorporated by reference in its entirety.

BACKGROUND

This disclosure relates generally to a computer-implemented human pose detection system and more particularly to a machine-learning model trained to estimate the actions of the user based on the user's pose and update the contents of a shopping cart accordingly.

Automated checkout systems allow users to check out from a store through an automated or semi-automated process. For example, some systems allow a user to scan or otherwise identify items as they collect them, and then automatically check out when they have collected their desired items. However, users may, intentionally or not, incorrectly identify an item placed in a shopping cart. Some systems use sensors and cameras on a shopping cart to track and/or identify items that a user adds to a cart. For example, some automated checkout systems use computer vision techniques for item identification. However, these techniques can consume substantial computing resources since the machine learning models that are used to identify items can be computationally intensive and generally must be performed regularly. This poses a particular problem when performed by a computing system coupled to a shopping cart, since these systems commonly have constrained computational and battery power. What is needed is a solution to conserve the computational resources of a smart shopping cart by incorporating a trigger mechanism to determine when to run the machine learning models, ensuring efficient and precise item identification while preserving critical computational resources.

SUMMARY

In accordance with one or more aspects of the disclosure, an automated checkout system uses a pose detection model to predict when a user has changed the contents of a shopping cart and uses these predictions as a trigger mechanism for when to identify an added or removed item. An automated checkout system uses cameras coupled to a shopping cart to capture images of the user. The automated checkout system uses a pose detection model to predict a pose of the user in the images captured by the cameras. A pose prediction model is a machine learning model that detects the user's pose in each image. Another machine learning model, the action prediction model, predicts, based on the detected pose, whether the user has performed an action in which the contents of the shopping cart storage area are changed, or a change action. If the action prediction model determines that a change action has taken place, an item identification model, based on a second set of images of the shopping cart storage area, identifies the item associated with the change action. The system updates the user's item list associated with the shopping cart based on this item identification and change action. In some aspects, the item identification model also considers the cart's previous item list and the detected change action to determine which item was moved. The invention increases the efficiency in automated checkout systems by using machine learning models to accurately predict and identify changes to a shopping cart's contents without expending excess computational resources.

BRIEF DESCRIPTION OF DRAWINGS

FIG. 3 is a flowchart illustrating an example method for estimating human pose to update shopping carts, in accordance with one or more illustrative embodiments.

Figure 1:
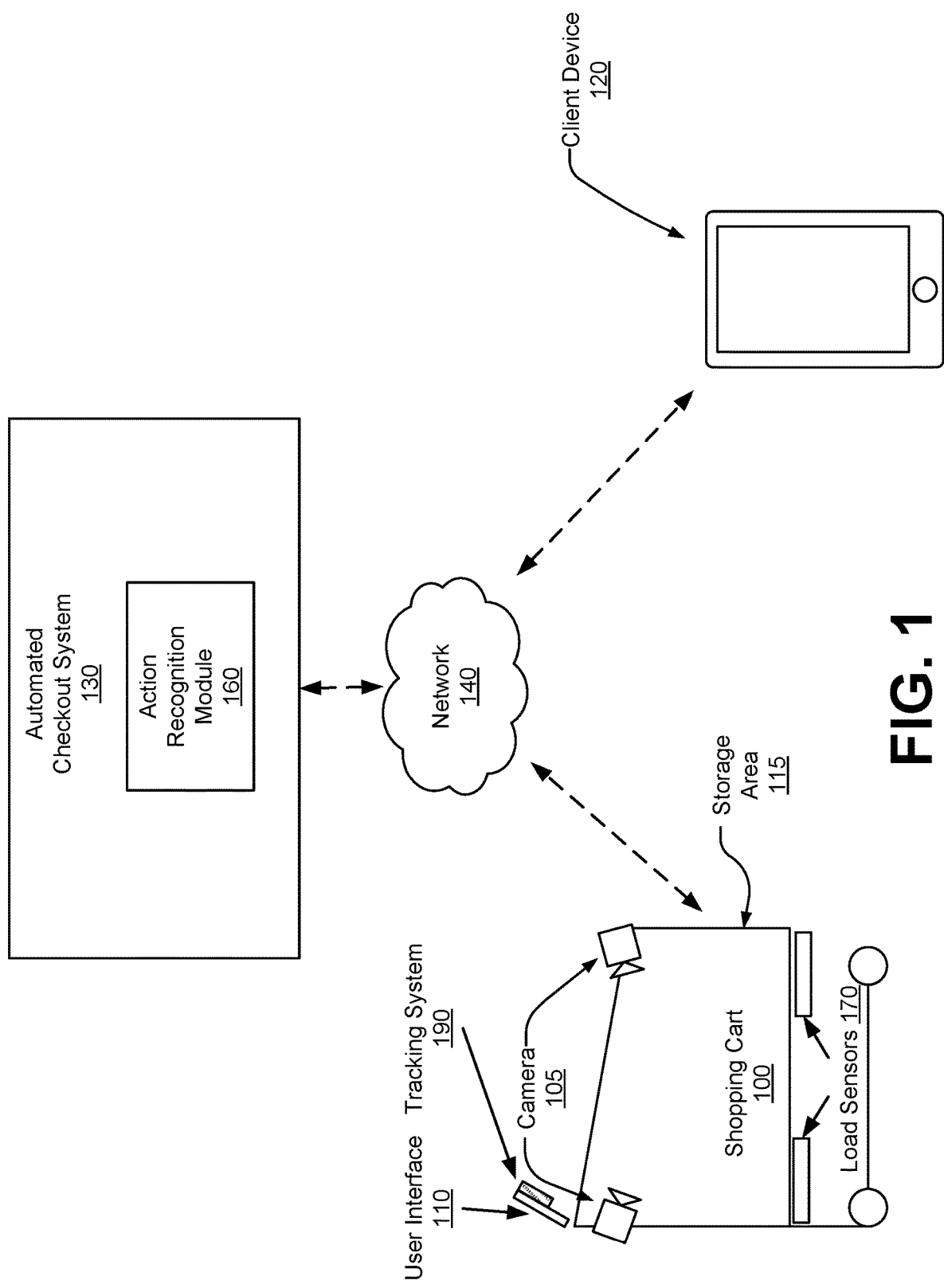
FIG. 1 illustrates an example environment of an automated checkout system, in accordance with one or more illustrative embodiments.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict various embodiments for purposes of illustration only. One skilled in the art will readily recognize from the following description that alternative embodiments of the structures and methods illustrated herein may be employed without departing from the principles of the disclosure described herein.

DETAILED DESCRIPTION

Example System Environment for Automated Checkout System

FIG. 1 illustrates an example system environment for an automated checkout system, in accordance with one or more illustrative embodiments. The system environment illustrated in FIG. 1 includes a shopping cart 100, a client device 120, an automated checkout system 130, and a network 140. Alternative embodiments may include more, fewer, or different components from those illustrated in FIG. 1, and the functionality of each component may be divided between the components differently from the description below. For example, functionality described below as being performed by the shopping cart may be performed, in some embodiments, by the automated checkout system 130 or the client device 120. Similarly, functionality described below as being performed by the automated checkout system 130 may, in some embodiments, be performed by the shopping cart 100 or the client device 120. Additionally, each component may perform their respective functionalities in response to a request from a human, or automatically without human intervention.

A shopping cart 100 is a vessel that a user can use to hold items as the user travels through a store. The shopping cart 100 includes one or more cameras 105 that capture image data of the shopping cart's storage area and a user interface 110 that the user can use to interact with the shopping cart 100. The shopping cart 100 may include additional components not pictured in FIG. 1, such as processors, computer-readable media, power sources (e.g., batteries), network adapters, or sensors (e.g., load sensors, thermometers, proximity sensors).

The cameras 105 capture image data of the shopping cart's storage area. The cameras 105 may capture two-dimensional or three-dimensional images of the shopping cart's contents. The cameras 105 are coupled to the shopping cart 100 such that the cameras 105 capture image data of the storage area from different perspectives. Thus, items in the shopping cart 100 are less likely to be overlapping in all camera perspectives. In some embodiments, the cameras 105 include embedded processing capabilities to process image data captured by the cameras 105. For example, the cameras 105 may be mobile industry processor interface (MIPI) cameras. The cameras 105 may be set to capture images from the area surrounding the shopping cart including the user of the cart. In some embodiments, at least one of the cameras 105 is directed outward, away from the shopping cart 100.

In some embodiments, the shopping cart 100 captures image data in response to detecting that an item is being added to the storage area. The shopping cart 100 may detect that an item is being added to the storage area 115 of the shopping cart 100 based on sensor data from sensors on the shopping cart 100. For example, the shopping cart 100 may detect that a new item has been added when the shopping cart 100 (e.g., load sensors 170) detects a change in the overall weight of the contents of the storage area 115 based on load data from load sensors. Similarly, the shopping cart 100 may detect that a new item is being added based on proximity data from proximity sensors indicating that something is approaching the storage area of the shopping cart 100. The shopping cart 100 may capture image data within a timeframe near when the shopping cart 100 detects a new item. For example, the shopping cart 100 may activate the cameras 105 and store image data in response to detecting that an item is being added to the shopping cart 100 and for some period of time after that detection.

The shopping cart 100 may include one or more sensors that capture measurements describing the shopping cart 100, items in the shopping cart's storage area, or the area around the shopping cart 100. For example, the shopping cart 100 may include load sensors 170 that measure the weight of items placed in the shopping cart's storage area. Load sensors 170 are further described below. Similarly, the shopping cart 100 may include proximity sensors that capture measurements for detecting when an item is added to the shopping cart 100. The shopping cart 100 may transmit data from the one or more sensors to the automated checkout system 130.

The one or more load sensors 170 capture load data for the shopping cart 100. In some embodiments, the one or more load sensors 170 may be scales that detect the weight (e.g., the load) of the content in the storage area 115 of the shopping cart 100. The load sensors 170 can also capture load curves—the load signal produced over time as an item is added to the cart or removed from the cart. The load sensors 170 may be attached to the shopping cart 100 in various locations to pick up different signals that may be related to items added at different positions of the storage area. For example, a shopping cart 100 may include a load sensor 170 at each of the four corners of the bottom of the storage area 115. In some embodiments, the load sensors 170 may record load data continuously while the shopping cart 100 is in use. In other embodiments, the shopping cart 100 may include some triggering mechanism, for example a light sensor, an accelerometer, or another sensor to determine that the user is about to add an item to the shopping cart 100 or about to remove an item from the shopping cart 100. The triggering mechanism causes the load sensors 170 to begin recording load data for some period of time, for example a preset time range.

The shopping cart 100 includes a user interface 110 through which the user can interact with the automated checkout system 130. The user interface 110 may include a display, a speaker, a microphone, a keypad, or a payment system (e.g., a credit card reader). The user interface 110 may allow the user to adjust the items in their shopping list or to provide payment information for a checkout process. Additionally, the user interface 110 may display a map of the store indicating where items are located within the store. In some embodiments, a user may interact with the user interface 110 to search for items within the store, and the user interface 110 may provide a real-time navigation interface for the user to travel from their current location to an item within the store. The user interface 110 also may display additional content to a user, such as suggested recipes or items for purchase.

The shopping cart 100 may include one or more wheel sensors (not shown) that measure wheel motion data of the one or more wheels. The wheel sensors may be coupled to one or more of the wheels on the shopping cart. In some embodiments, a shopping cart 100 includes at least two wheels (e.g., four wheels in the majority of shopping carts) with two wheel sensors coupled to two wheels. In further embodiments, the two wheels coupled to the wheel sensors can rotate about an axis parallel to the ground and can orient about an axis orthogonal or perpendicular to the ground. In other embodiments, each of the wheels on the shopping cart has a wheel sensor (e.g., four wheel sensors coupled to four wheels). The wheel motion data includes at least rotation of the one or more wheels (e.g., information specifying one or more attributes of the rotation of the one or more wheels). Rotation may be measured as a rotational position, rotational velocity, rotational acceleration, some other measure of rotation, or some combination thereof. Rotation for a wheel is generally measured along an axis parallel to the ground. The wheel rotation may further include orientation of the one or more wheels. Orientation may be measured as an angle along an axis orthogonal or perpendicular to the ground. For example, the wheels are at 0° when the shopping cart is moving straight and forward along an axis running through the front and the back of the shopping cart. Each wheel sensor may be a rotary encoder, a magnetometer with a magnet coupled to the wheel, an imaging device for capturing one or more features on the wheel, some other type of sensor capable of measuring wheel motion data, or some combination thereof.

The shopping cart 100 includes a tracking system 190 configured to track a position, an orientation, movement, or some combination thereof of the shopping cart 100 in an indoor environment. The tracking system 190 may be a computing system comprising at least one processor and computer memory. The tracking system 190 may further include other sensors capable of capturing data useful for determining position, orientation, movement, or some combination thereof of the shopping cart 100. Other example sensors include, but are not limited to, an accelerometer, a gyroscope, etc. The tracking system 190 may provide real-time location of the shopping cart 100 to an online system and/or database. The location of the shopping cart 100 may inform content to be displayed by the user interface 110. For example, if the shopping cart 100 is located in one aisle, the display can provide navigational instructions to a user to navigate them to a product in the aisle. In other example use cases, the display can provide suggested products or items located in the aisle based on the user's location.

A user can also interact with the shopping cart 100 or the automated checkout system 130 through a client device 120. The client device 120 can be a personal or mobile computing device, such as a smartphone, a tablet, a laptop computer, or desktop computer. In some embodiments, the client device 120 executes a client application that uses an application programming interface (API) to communicate with the automated checkout system 130 through the network 140. The client device 120 may allow the user to add items to a shopping list and to checkout through the automated checkout system 130. For example, the user may use the client device 120 to capture image data of items that the user is selecting for purchase, and the client device 120 may provide the image data to the automated checkout system 130 to identify the items that the user is selecting. The client device 120 may adjust the user's shopping list based on the identified item. In some embodiments, the user can also manually adjust their shopping list through the client device 120.

The automated checkout system 130 allows a customer at a brick-and-mortar store to complete a checkout process in which items are scanned and paid for without having to go through a human cashier at a point-of-sale station. The automated checkout system 130 receives data describing a user's shopping trip in a store and generates a shopping list based on items that the user has selected. For example, the automated checkout system 130 may receive image data from a shopping cart 100 and may determine, based on the image data, which items the user has added to their cart. When the user indicates that they are done shopping at the store, the automated checkout system 130 facilitates a transaction between the user and the store for the user to purchase their selected items. As noted above, while the automated checkout system 130 is depicted in FIG. 1 as separate from the shopping cart 100 and the client device 120, some or all of the functionality of the automated checkout system 130 may be performed by the shopping cart 100 or the client device 120, and vice versa. Although the automated checkout system 130 is described herein with reference to a shopping cart, the automated checkout system 130 may be mounted in any suitable retail environment, for example a kiosk or checkout counter.

The automated checkout system 130 establishes a session for a user to associate the user's actions with the shopping cart 100 to that user. The user may establish the session by inputting a user identifier (e.g., phone number, email address, username, etc.) into a user interface 110 of the shopping cart 100. The user also may establish the session through the client device 120. The user may use a client application operating on the client device 120 to associate the shopping cart 100 with the client device 120. The user may establish the session by inputting a cart identifier for the shopping cart 100 through the client application, e.g., by manually typing an identifier or by scanning a barcode or QR code on the shopping cart 100 using the client device 120. In some embodiments, the automated checkout system 130 establishes a session between a user and a shopping cart 100 automatically based on sensor data from the shopping cart 100 or the client device 120. For example, the automated checkout system 130 may determine that the client device 120 and the shopping cart 100 are in proximity to one another for an extended period of time, and thus may determine that the user associated with the client device 120 is using the shopping cart 100.

The automated checkout system 130 generates a shopping list for the user as the user adds items to the shopping cart 100. The shopping list is a list of items that the user has gathered in the storage area 115 of the shopping cart 100 and intends to purchase. The shopping list may include identifiers for the items that the user has gathered (e.g., stock keeping units (SKUs)) and a quantity for each item. As illustrated in FIG. 1, the automated checkout system 130 comprises an action recognition module 160.

The action recognition module 160, using the pose of the user, determines the action the user has taken with reference to an identified item. To determine the action taken by the user of the shopping cart 100, the action recognition module 160 analyzes image data captured by the cameras 105 on the shopping cart 100 as well as other sensors on the shopping cart 100 such as load sensors 170. In addition, the action recognition module 160 detects the pose of the user based on the analysis of those images, detects the action of the user based on the detected pose, and updates the shopping list associated with the shopping cart 100 based on the identified items within the cart. The action recognition module 160 detects the pose, predicts the action, and identifies the item by applying one or more machine-learning models (e.g., a neural network) to the images collected by the cameras 105. The machine-learning models output a confidence score in the determined output based on the provided input. The action recognition module 160 is further described below with reference to FIG. 3.

The automated checkout system 130 facilitates a checkout by the user through the shopping cart 100. The automated checkout system 130 computes a total cost to the user of the items in the user's shopping list and charges the user for the cost. The automated checkout system 130 may receive payment information from the shopping cart 100 and uses that payment information to charge the user for the items. Alternatively, the automated checkout system 130 may store payment information for the user in user data describing characteristics of the user. The automated checkout system 130 may use the stored payment information as default payment information for the user and charge the user for the cost of the items based on that stored payment information.

In some embodiments, a user who interacts with the shopping cart 100 or the client device 120 may be an individual shopping for themselves or a shopper for an online concierge system. The shopper is a user who collects items from a store on behalf of a user of the online concierge system. For example, a user may submit a list of items that they would like to purchase. The online concierge system may transmit that list to a shopping cart 100 or a client device 120 used by a shopper. The shopper may use the shopping cart 100 or the client device 120 to add items to the user's shopping list. When the shopper has gathered the items that the user has requested, the shopper may perform a checkout process through the shopping cart 100 or client device 120 to charge the user for the items. U.S. Pat. No. 11,195,222, entitled "Determining Recommended Items for a Shopping List," issued Dec. 7, 2021, describes online concierge systems in more detail, which is incorporated by reference herein in its entirety.

The shopping cart 100 and client device 120 can communicate with the automated checkout system 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In some embodiments, the network 140 may include Bluetooth or near-field communication (NFC) technologies or protocols for local communications between computing devices. The network 140 may transmit encrypted or unencrypted data.

Example System Architecture for an Action Recognition Module

Figure 2:
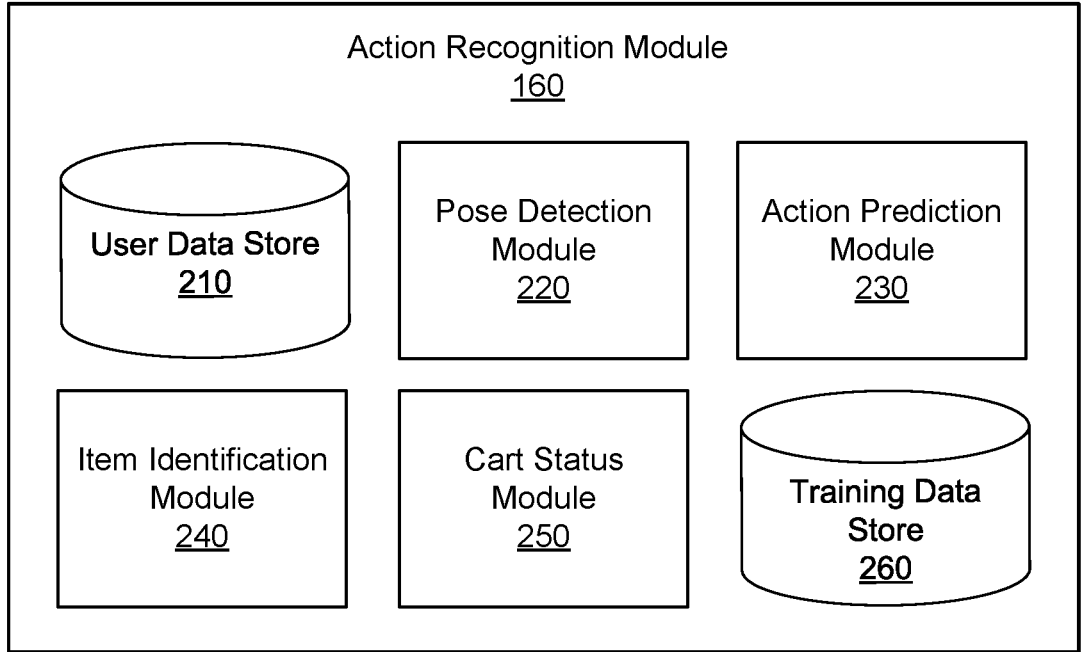
FIG. 2 illustrates an example system architecture for an action recognition module, in accordance with one or more illustrative embodiments.

FIG. 2 illustrates an example system architecture for an action recognition module 160, in accordance with one or more illustrative embodiments. The action recognition module 160 may be included in the system of the shopping cart 100 or may be a part of the online system otherwise connected to the network 140. The action recognition module 160 includes a user data store 210, a pose detection module 220, cart update module 250, action prediction module 230, and a training data store 260. Computer components such as web servers, network interfaces, security functions, load balancers, failover servers, management and network operations consoles, and the like are not shown so as to not obscure the details of the system architecture. Alternative embodiments may include more, fewer, or different components from those illustrated in FIG. 2, and the functionality of each component may be divided between the components differently from the description below.

The user data store 210 stores image frames and other data of the user received from the one or more cameras 105. As described above, the cameras 105 capture images of the storage area 115 of the shopping cart 100. Depending on the orientation and configuration of the cameras 105, the image frames capture images with various perspectives of the user and the motions of the user. The images stored in the user data store 210 include metadata that describes which camera 105 captured each image. Additionally, each image may include a timestamp of when the image was captured by the camera 105. The user data store 210 may also include information collected associated with the behavior of the user, the user's interactions with user interface 110 and shopping cart 100. The user data store 210 may include images taken from cameras mounted in the store and not directly coupled to the shopping cart 100. The user data store 210 may include a user's profile history.

In some embodiments, the shopping cart detects that the user may have changed which items are present in the shopping cart's storage area to determine when to detect the pose of a user. To do so, the shopping cart 100 may detect a possible change in the shopping cart 100 through the use of sensors coupled to the shopping cart. For example, the shopping cart may detect a change in weight in the storage area 115 of the shopping cart based on data from load sensors. Similarly, the shopping cart may use proximity sensors to detect when an object has moved into or out of the shopping cart 100.

The action recognition module 160 detects whether a user has performed a change action with regards to the contents of their shopping cart and updates the status of the shopping cart accordingly. A change action is the potential change to the cart contents. For example, a change action may include the addition of an item to the shopping cart or a removal of an item from the shopping cart. Once a potential change action is flagged, the action recognition module 160 confirms whether a change action did occur and if so, which one. A user may also have a potential change in the shopping cart that is determined not to be a change action due, such as when the user shuffles items around in the storage area 115. Such actions may be flagged as a potential change and the action recognition module 160 determines such actions are not change actions.

The pose detection module 220 detects the pose of the user of the shopping cart 100 based on images captured by the cameras coupled to the shopping cart. A user's pose is a three-dimensional representation of the user's arrangement and position of their body segments. For example, a user's pose may be represented through joint angles, a skeletal hierarchical structure, key point coordinates, or meshes. In some embodiments, the user's detected pose corresponds to their pose in a corresponding image captured by a camera, and may thereby correspond to a timestamp when the corresponding image was captured.

The pose detection module 220 uses a pose detection model to detect the pose of a user based on images captured by cameras of the shopping cart. A pose detection model is a machine learning model that is trained to generate a representation of a user's pose based on an image depicting the user's body. The pose detection model may generate a pose representation that represents the spatial orientation of the user's body by including identified key points on the human body, coordinates of that key point, and confidence scores representing the likelihood that a key point is accurately located.

The pose detection model is trained based on data from the training data store 260. The training data includes a set of training examples. Each training example includes an image of a user and a label that indicates the pose of the user in the image. The pose detection module 220 uses these training examples to train the pose detection model by applying the pose detection model to an image in the training example and comparing a pose output by the pose detection model to the label included for the training example.

The action prediction module 230 predicts whether a user performed a change action based on images depicting the user and the user's pose as detected by the pose detection module 220. As described above, a change action is a potential change to the cart contents. If the action prediction module 230 predicts that the user has performed a change action, the action prediction module 230 may further predict a type of the change action. For example, the action prediction module 230 may predict whether the change action was an addition or a removal of an item from the shopping cart.

The action prediction module 230 uses an action prediction model to predict whether a user has performed a change action. An action prediction model is a machine learning model that is trained to compute an action prediction score that indicates a likelihood that a user trained with data from the training data store 260. The action prediction model is trained with examples of images and videos of users interacting with a shopping cart 100, identified poses of the users from the images, and actions that the user was taking at the time of each set of poses. The action prediction model may be trained with examples including individual frames and images as well as videos and sets of poses. The actions associated with a pose or set of poses may include adding an item to the shopping cart 100, removing an item from the shopping cart 100, shuffling items within the shopping cart 100, and checking the label of something in the shopping cart 100. Once trained using these examples, the action prediction model predicts the actions the user is taking in a set of images from the camera 105. The action prediction model predicts whether a change action by computing a confidence score that represents the likelihood that a user performed a change action. If the score exceeds a threshold, the action prediction module determines that a change action occurred. In embodiments where the action prediction model predicts a type of change action, the action prediction model may generate a confidence score for each possible type of change action that could occur, and predicts which type of change action occurred based on the computed confidence scores. In these embodiments, the action prediction model may be a classifier neural network.

The item identification module 240 identifies an item that is associated with a change action based on images captured by cameras coupled to the shopping cart. The item identification module uses an item identification model to identify the items in the shopping cart's storage area. An item identification model is a machine-learning model that is trained to predict which items are located in the shopping cart's storage area based on images captured of the storage area. For example, the item identification model may generate a list of item identifiers for items that are depicted in the storage area of a shopping cart. An example item identification model is described in U.S. patent application Ser. No. 17/703,076, entitled "Image-Based Barcode Decoding" and filed Mar. 24, 2022, which is incorporated by reference.

In some embodiments, the item identification module 240 may determine a difference between items that were stored in the cart before the change action and items that were stored in the cart after the change action, and use that difference to identify the item that was associated with the change action. For example, the item identification module may apply the item identification model to a first image at a first time before the change action is detected to identify the set of items in the shopping cart at that first time. The item identification module may apply the item identification model to a second image at a second time after the change action to identify the set of items in the shopping cart at the second time. By comparing the two sets of items, the item identification module determines the difference in the sets to identify which item was subject to the change action. In some embodiments, the item identification model takes the type of change action and the first set of items as an input and uses those signals to predict the second set of items in the shopping cart.

The cart update module 250 updates the status of the shopping cart 100 based on the prediction action from the action prediction module 230. The cart update module 250 receives the action from the action prediction module 230 and at least one item entry from the store catalog from item identification module 240. The cart update module 250 updates the user's shopping list, generated by the automated checkout system 130, by adding or removing items based on the user's interactions. In some embodiments, the cart update module 250 receives from the item identification module 240 a current inventory of the shopping cart 100 and checks to confirm that the item list matches the provided list from the item identification module 240. In other embodiments, the cart update module 250 receives a specific item entry and an indicated action, such as a removal, and changes the item list by removing that specific item entry from the item list. In certain embodiments, the cart update module 250 also facilitates the updating of a user interface (UI), offering a visual representation of the changes made to the shopping cart 100. This can be accomplished by dynamically modifying the UI to display the current contents of the shopping cart or by reflecting changes in a more detailed list format, ensuring a seamless user experience. The cart update module 250 may generate a prompt that confirms the changes to the shopping cart 100. This prompt allows the user to verify or correct any updates in real-time and helps minimize potential errors in the shopping cart list, contributing to a smoother and more accurate shopping process.

In some embodiments, the action recognition module 160 determines that feedback is needed and requests confirmation from the user regarding whether the change action was properly detected and the status of the shopping cart 100 properly updated. Responsive to feedback from the user via the user interface 110, that feedback is stored in the training data store 260 with the data associated with that feedback as data, and the label based on the user's feedback.

In some embodiments, the training data described above may be associated with a particular retailer location and thereby train the respective machine-learning models to detect poses or predict actions for that corresponding retailer location. For example, the training data set 260 may only store labeled features for items available in that particular store.

While the description herein may focus on separate pose detection and action prediction models, alternative embodiments of the automated checkout system may use a single machine-learning model that predicts whether images depict a change action and what type of change action is depicted. For example, this machine-learning model may be applied to one or more images to output a classification that indicates the likelihood that the images depict a change action.

Example Implementation of Automated Checkout System

FIG. 3 is a flowchart illustrating a method for detecting a user's pose to predict when the user has performed a change action with a shopping cart, in accordance with some embodiments.

The action recognition module 160 accesses 305 a set of images captured by one or more cameras 105 coupled to a shopping cart 100. Each image of the set of images depicts a user associated with the shopping cart 100. The images may be captured by cameras that point inwards towards a storage area of the shopping cart or by cameras that point outwards towards the surroundings of the shopping cart. In some embodiments, the action recognition module 160 also accesses sensor data captured by sensors coupled to the shopping cart, such as weight sensor data captured by a weight sensor coupled to a storage area of the shopping cart.

The action recognition module 160 applies 310 the pose detection model to each of the set of images to predict the pose of the user. The pose may be detected in each frame captured over a period of time or may be identified in specific images. For this detection, the pose detection module 220 receives the images captured by cameras 105, stored in user data store 210. The pose detection module 220 may also receive other sensor data from the shopping cart 100 including data captured by temperature or motion sensors embedded in the cart, such as infrared or ultrasonic sensors to detect the proximity of the cart to items, objects, or users. For example, if the user places a box of pasta in the shopping cart 100, the cameras 105 capture the set of images of the motion, possibly from one camera or from multiple angles from cameras 105 placed at different places on the shopping cart 100. The images may cover a portion of time such as from a few seconds before the user reached into the shopping cart 100 to a few seconds after. The action recognition module 160 receives these images of the user's motion and provides the images to the pose detection model to determine for each image the detected pose of the user as the user reaches into the shopping cart 100. In another example, if the proximity sensors detect that a user has interacted with objects inside the shopping cart 100, such as the pasta boxes, that sensor data may be included, in addition to the images from the cameras 105, as input to the pose detection model.

In some embodiments, the pose detection model considers as input information about the user from the user's profile history and is customized to the pose of that specific user. In embodiments where the user's profile history is taken into account, the user is prompted to confirm their identity while using the shopping cart and the identity of the user is known prior to the potential change action. The pose detection model may receive as input information related to the user's past shopping behavior, past purchases, and information that improve the pose detection such as images of the user.

The action recognition module 160 applies 320 the action prediction model to the images from the shopping cart 100, as well as the predicted poses, to predict whether the user performed a change action in the captured images. Some possible change actions include the addition of a new item to the shopping cart, the removal of an item from the shopping cart, or shuffling of items within the shopping cart. The shuffling of items within the shopping cart 100 is an action of no change in that the contents of the shopping cart 100 have not changed and it was a false alarm. For example, if a user reaches into the shopping cart 100 and moves around some items to count how many items boxes of pasta have been grabbed so far, that is not a change action even if items have been moved around or maybe even momentarily removed from the shopping cart 100. In another example, if a user after counting boxes of pasta, proceeds to add to the shopping cart 100 a jar of tomato sauce, which is a change action. The action prediction model output indicates this distinction as well as a confidence level according to the provided pose and image data.

The action recognition module 160, responsive to predicting that the user performed a change action, applies 320 an item identification model to a second set of images of a storage area 115 of the shopping cart 100 to identify an item associated with the change action. The item identification module 240 receives the action from the action prediction module 230, as well as images of the shopping cart shopping cart 100 to determine what item is associated with the detected action of the user. In one or more embodiments, in response to action prediction module 230 detecting that the change was a removal, the item identification module 240 detects which item that was recently in the shopping cart is now missing from the storage area 115 and so has been removed. For example, if the user adds a jar of tomato sauce to the shopping cart 100 and the action prediction model has identified that a change action occurred as an addition of an item to the shopping cart 100, the item identification model, applied to the images of the user and the shopping cart 100, identifies that the item that the user touched during the identified change action is a jar of tomato sauce.

The action recognition module 160 updates 325 user's shopping list, generated by the automated checkout system 130, based on the change action and the identified item. The cart update module 250 receives the item identification and the change action and makes a corresponding update to the list. Responsive to the change action being an addition to the shopping cart, the cart update module 250 adds the identified item to the item list. Responsive to the change action being a removal of an item, the cart update module 250 removes the identified item from the item list. For example, the new jar of tomato sauce, having been identified as the item that was added by the user, is now added to the user's shopping list. In some embodiments, the cart update module 250 prompts the user for confirmation or feedback based on the item identification and change action. The action recognition module 160 may store the received confirmation or feedback in the user data store 210 as information about the user, or in the training data store 260 to train models going forward.

Figure 4:
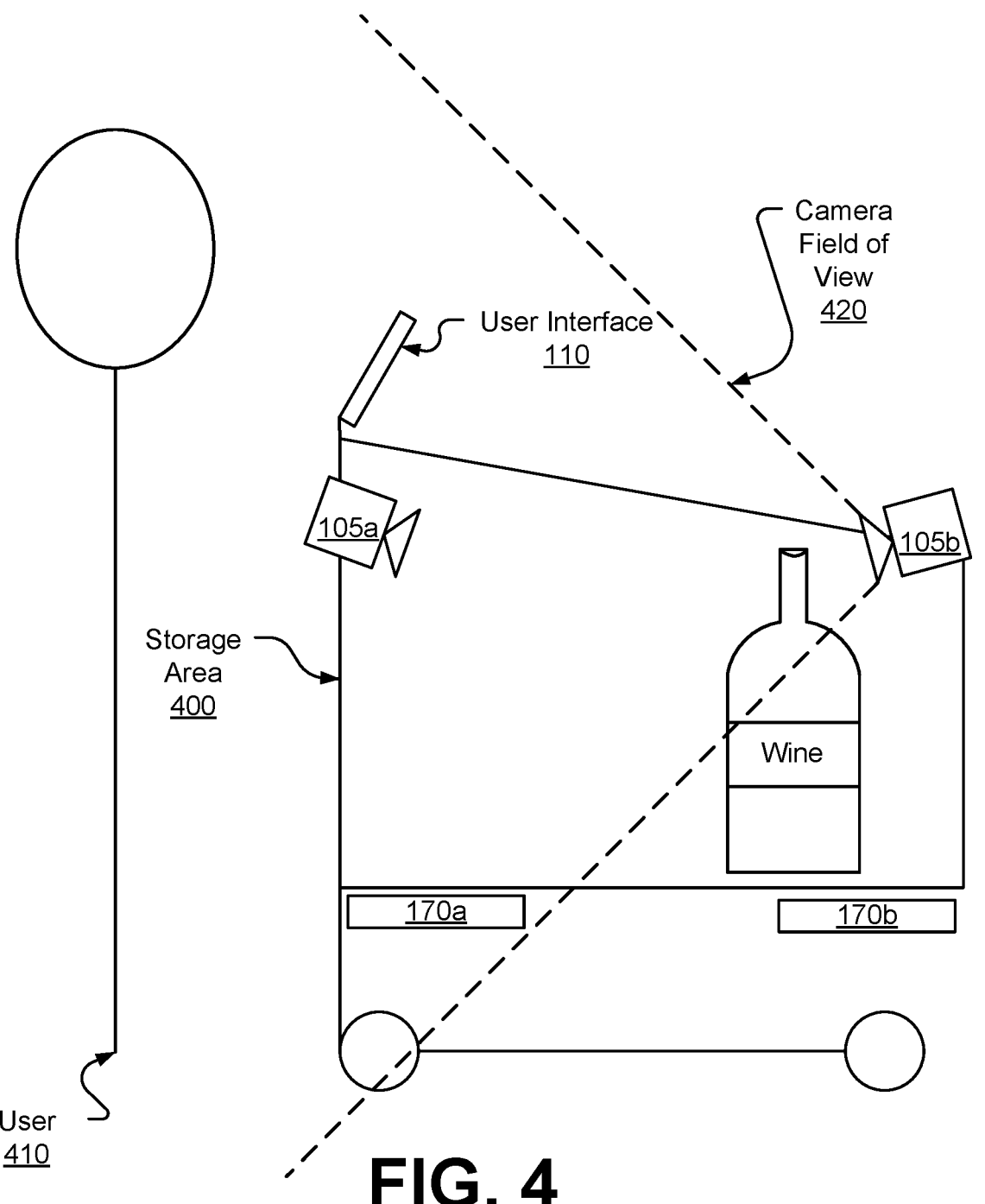
FIG. 4 is an illustration of an example shopping cart in which a user has placed an item, in accordance with one or more illustrative embodiments.

FIG. 4 is an illustration of a shopping cart in which a user has placed an item, in accordance with one or more illustrative embodiments. Consistent with the description in FIG. 1, the illustrated shopping cart includes a storage area 400, cameras 105a and 105b, and a user interface 110. A user 410 of the shopping cart places a bottle of wine in the storage area 400. The load sensors 170a and 170b measure the weight of items placed in the shopping cart. The cameras 105 and/or the load sensors 170 capture the change in the storage area 400 of the shopping cart. The system uses the images captured of the user 410 during the change to determine the pose of the user 410. A user 410 may identify the item placed in the storage area 400 by manually identifying the item using the user interface 110. and so manually identify that a change has occurred. The camera 105b has a field of view 420 which includes a perspective of the user 410, such that the images of camera 105b include images of the user 410 placing the bottle of wine into the storage area 400.

Figure 5:
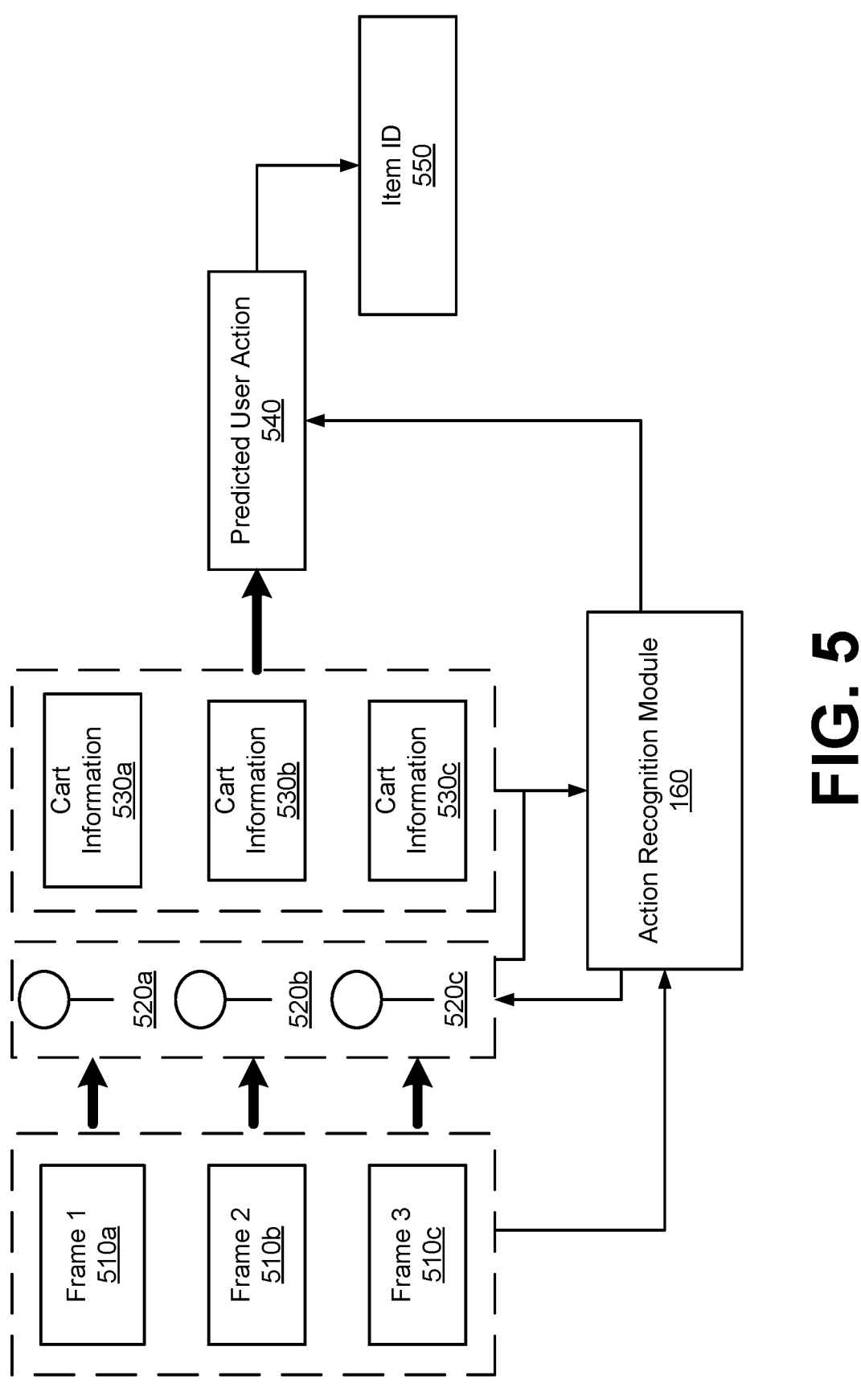
FIG. 5 is an illustration of an example data flow through the pose determination module, in accordance with one or more illustrative embodiments.

FIG. 5 is an illustration of the data flow through the action recognition module, in accordance with one or more illustrative embodiments. Frames 510 are captured by cameras 105. The frames 510 includes a set of images. The set of images can be of any size greater than one. In the embodiment of FIG. 5, frames 510 includes a first frame 510a, a second frame 510b and a third frame 510c. In some embodiments, each of the frames within the frames 510 is a different point in time, and the frames 510 together capture a window of time of the user's poses. In other embodiments, each of the frames 510 captures a different perspective of the user at a single point in time. In some embodiments, frames 510 includes a combination of both various perspectives and various points in time.

The user data store 210 stores frames 510 and the pose detection module 220 within the action recognition module 160 receives the frames 510. The pose detection module 220 outputs pose estimates 520, including a pose estimate for each of the frames 510, including a first pose estimate 520a, a second pose estimate 520b, and a third pose estimate 520c. Each pose estimate may be matched with other information about the shopping cart 100 at the time of the corresponding frame of frames 510. Information about the shopping cart 100 can include the location of the shopping cart 100 within the store, the weight of the items within the shopping cart 100, and any other sensor data collection from the shopping cart 100. The combined information of the pose estimates 520, the frames 510, and the corresponding cart information 530 is provided to the action prediction module 230 within the action recognition module 160 to determine the predicted action 540 of the user. The cart information 530 may be organized and associated with specific frames such as the first cart information 530a that corresponds to the cart at the same of the first frame 510a. The second cart information 530b may correspond to cart at the second frame 510b. The different frames 510 may be at different moments of time, or may be different angles of the same shopping cart 100. As such, the different portions of corresponding cart information 530 may overlap in time in some embodiments.

If the predicted action 540 is determined to be a change action which changes the contents of the shopping cart 100, the item identification module 240 identifies the corresponding item in the shopping cart 100 that is associated with the predicted action 540. The item identification 550 and the associated predicted action 540 are provided to the cart update module 250 to update the item list for the user.

OTHER CONSIDERATIONS

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising:

accessing a first set of images captured by one or more cameras coupled to a shopping cart, wherein each image of the first set of images depicts a user associated with the shopping cart;

applying a pose detection model to each of the set of images to predict a pose of the user depicted in each of the first set of images, wherein the pose detection model is a machine-learning model trained to predict the pose of a user depicted in an image;

applying an action prediction model to the set of images and the predicted poses to predict whether the user performed a change action, wherein the change action is an action performed by the user whereby the user changes contents of a storage area of the shopping cart, and wherein the action prediction model is a machine-learning model trained to predict whether a user performed a change action to a shopping cart based on images depicting the user and the poses of the user in the images;

responsive to predicting that the user performed a change action, applying an item identification model to a second set of images of a storage area of the shopping cart to identify an item associated with the change action, wherein applying the item identification model to the second set of images of the storage area of the shopping cart to identify an item associated with the change action further comprises:

responsive to detecting the change action, accessing a previous list of items that were in the cart before the action; and inputting the images, the previous list, and the change action into the item identification model to predict which item was associated with the change action; and updating, based on the change action and the identified item, an item list of the user.

2. The method of claim 1, wherein the first set of images comprises a subset of the second set of images.

3. The method of claim 1, wherein updating the item list of the user comprises displaying the updated item list on a user interface of the shopping cart.

4. The method of claim 1, wherein the action prediction model predicts a type of the change action, and wherein the method further comprises updating the item list of the user based on the type of the change action.

5. The method of claim 4, wherein predicting the type of the change action comprises predicting at least one of:

an addition of a new item to the shopping cart or a removal of an item from the shopping cart.

6. The method of claim 1, further comprising:

applying pose detection model to sensor data captured by sensors coupled to the shopping cart to predict the pose.

7. A non-transitory computer-readable storage medium storing instructions that, when executed by a processor, cause the processor to:

access a first set of images captured by one or more cameras coupled to a shopping cart, wherein each image of the set of images depicts a user associated with the shopping cart;

apply a pose detection model to each of the set of images to predict a pose of the user depicted in each of the set of images, wherein the pose detection model is a machine-learning model trained to predict the pose of a user depicted in an image;

apply an action prediction model to the set of images and the predicted poses to predict whether the user performed a change action, wherein the change action is an action whereby the user changes contents of a storage area of the shopping cart, and wherein the action prediction model is a machine-learning model trained to predict whether a user performed a change action to a shopping cart based on images depicting the user and poses of the user in the images;

responsive to predicting that the user performed a change action, apply an item identification model to a second set of images of a storage area of the shopping cart to identify an item associated with the change action, wherein applying the item identification model to the second set of images of the storage area of the shopping cart to identify an item associated with the change action further comprises:

responsive to detecting the change action, accessing a previous list of items that were in the cart before the action; and inputting the images, the previous list, and the change action into the item identification model to predict which item was associated with the change action; and update an item list of the user based on the change action and the identified item.

8. The non-transitory computer-readable storage medium of claim 7, wherein the first set of images comprises a subset of the second set of images.

9. The non-transitory computer-readable storage medium of claim 7, wherein the instructions to update the item list of the user based on the change action and the identified item further comprises instructions to display the updated item list on a user interface of the shopping cart.

10. The non-transitory computer-readable storage medium of claim 7, wherein the change action is one of a set of possible actions and wherein the set of possible actions includes at least addition of a new item to the shopping cart, and removal of an item from the shopping cart.

11. The non-transitory computer-readable storage medium of claim 7, wherein the change action is the user adding an item to the shopping cart, and wherein the instructions to update of the item list further comprises instructions to add the identified item to the item list.

12. The non-transitory computer-readable storage medium of claim 7, wherein the change action is the user removing an item from the shopping cart, and wherein the updating of the item list further comprises removing the identified item from the item list.

13. The non-transitory computer-readable storage medium of claim 7, wherein instructions to access a first set of images captured by one or more cameras coupled to a shopping cart further comprises instructions to access sensor data captured by sensors coupled to the shopping cart; and instructions to apply the pose detection model to each of the set of images to predict a pose of the user further comprises instructions to apply the pose detection model to the set of images and the sensor data.

14. The non-transitory computer-readable storage medium of claim 7, further comprising instructions to access a user history associated with the user of the shopping cart.

15. A system comprising:

at least one processor; and memory storing non-transitory computer-readable storage instructions, that when executed by at least one processor, cause the at least one processor to:

access a first set of images captured by one or more cameras coupled to a shopping cart, wherein each image of the set of images depicts a user associated with the shopping cart;

apply a pose detection model to each of the set of images to predict a pose of the user depicted in each of the set of images, wherein the pose detection model is a machine-learning model trained to predict the pose of a user depicted in an image;

apply an action prediction model to the set of images and the predicted poses to predict whether the user performed a change action, wherein the change action is an action whereby the user changes contents of a storage area of the shopping cart, and wherein the action prediction model is a machine-learning model trained to predict whether a user performed a change action to a shopping cart based on images depicting the user and poses of the user in the images;

responsive to predicting that the user performed a change action, apply an item identification model to a second set of images of a storage area of the shopping cart to identify an item associated with the change action, wherein applying the item identification model to the second set of images of the storage area of the shopping cart to identify an item associ-
ated with the change action further comprises:
responsive to detecting the change action, accessing
a previous list of items that were in the cart before
the action; and
inputting the images, the previous list, and the
change action into the item identification model to
predict which item was associated with the change
action; and
update an item list of the user based on the change
action and the identified item.

16. The system of claim 15, wherein the instructions that
cause the at least one processor to update the item list of the
user based on the change action and the identified item
further comprises instructions to display the updated item
list on a user interface of the shopping cart.

17. The system of claim 15, wherein the action prediction
model predicts a type of the change action, and wherein the
instructions further cause the processor to update the item
list of the user based on the type of the change action.

18. The system of claim 17, wherein the instructions that
cause the processor to predict the type of the change action
comprises instructions to cause the processor to predict at
least one of: an addition of a new item to the shopping cart,
or a removal of an item from the shopping cart.

* * * * *